United States Patent [19]

Boghosian

[11] 4,155,738
[45] May 22, 1979

[54] METHOD OF STABILIZING A PEROXIDE-CONTAINING COMPOSITION

[75] Inventor: Malcolm P. Boghosian, Long Beach, Calif.

[73] Assignee: Allergan Pharmaceuticals, Inc., Irvine, Calif.

[21] Appl. No.: 891,511

[22] Filed: Mar. 30, 1978

[51] Int. Cl.² .......................... C05F 7/00; C05C 9/00; C01B 15/02; A61L 13/00

[52] U.S. Cl. ............................................ 71/25; 71/28; 71/31; 71/DIG. 2; 252/186; 423/273

[58] Field of Search ........................ 71/1, 11, 31, 64 C, 71/25, 27, DIG. 2, 28, 64 SC; 252/186; 260/610 A; 423/272, 273

[56] References Cited

U.S. PATENT DOCUMENTS 3,801,512  4/1974  Solenberger .......................... 423/273
3,912,490 10/1975  Boghasian ............................... 71/28

FOREIGN PATENT DOCUMENTS 696645   10/1964  Canada ................................................. 71/1
41-16089  9/1966  Japan ................................................. 71/25
43-6379   9/1968  Japan ................................................. 71/28
1285151   8/1972  United Kingdom ...................... 423/272

OTHER PUBLICATIONS

Chem. Abstract of British Patent No. 972655.

Primary Examiner—Joseph Scovronek
Assistant Examiner—Chris P. Konkol
Attorney, Agent, or Firm—Martin A. Voet

[57] ABSTRACT

A method of stabilizing an aqueous, peroxide containing composition and the resulting stabilized composition. Preferably, EDTA and a magnesium salt are also included in the stabilized composition.

11 Claims, No Drawings

METHOD OF STABILIZING A PEROXIDE-CONTAINING COMPOSITION

BACKGROUND OF THE INVENTION

1. Field of the Invention

The invention relates to a method for stabilizing an aqueous, peroxide-containing composition and to the resulting stabilized composition. More particularly, the invention relates to a stabilized, liquid plant food containing hydrogen peroxide or urea peroxide.

2. Background of the Prior Art

It is well-known that hydrogen peroxide and urea peroxide will degrade and release oxygen and that these reactions are catalyzed by trace metals, particularly iron and copper. Further, peroxides will undergo oxidization reduction reactions. In the past, a number of methods of stabilization have been used to stabilize commercial batches of hydrogen peroxide. These methods all give a clear, colorless solution of hydrogen peroxide and most of the methods used use the stannate type stabilizers or EDTA (ethylene diamine tetraacetic acid).

U.S. Pat. No. 3,912,490 describes a unique composition and method for treating plants to provide oxygen to plant roots and to prevent damage caused by overwatering. The composition includes an aqueous formula containing hydrogen peroxide or urea peroxide. In using the foregoing composition commercially, a problem of stability or lack of suitable shelf life has developed, that is, over a period of time, aqueous solutions of the composition of U.S. Pat. No. 3,912,490 tend to prematurely decompose chemically or by release of oxygen thereby distorting the container in which the composition is stored.

SUMMARY OF THE INVENTION

There has now been discovered a method of stabilizing an aqueous, peroxide-containing composition comprising stabilizing the composition with a stabilizing amount of lignin sulfonate. It has also been discovered that the stabilizing effect of lignin sulfonate is enchanced by the use of EDTA and is further enhanced by the use of a nontoxic magnesium salt.

DESCRIPTION OF THE INVENTION

The method used herein utilizes a lignin product, particularly a lignin sulfonate. The lignin sulfonates range in molecular weight, contain small amounts of natural sugars and some higher molecular weight carbohydrates. These agents have heretofore been used as dispersants, binders, sequestering (chelating) agents, floatation agents, emulsifiers and emulsion stabilizers.

The lignin sulfonates used herein are commercially available in the United States. Lignin sulfonates are found in a number of salt forms including ammonium, calcium and sodium lignin sulfonates. Lignin sulfonates are nonphytotoxic and impart a brown coloration to the solutions suitable for a fertilizer composition.

In addition to the lignin sulfonate, ethylene diamine tetraacetic acid (EDTA) and a nontoxic magnesium salt may be used to enhance the stabilizing activity of the lignin sulfonate. it has been found that when the combination of the three ingredients are used, the stability of urea peroxide or hydrogen peroxide is maintained for prolonged periods. That is, the chemical character and physical appearance of the solution is maintained and the container in which the solution is placed is not distorted due to pressure buildup due to oxygen release. It has further been found that the lignin sulfonate alone prevents physical package deformity which is not accomplished by EDTA and magnesium salts. It has further been found that the solutions so prepared and used do not damage indoor plants or prevent the germination of seeds even when used over prolonged periods.

The amount of lignin sulfonate which is an effective, stabilizing amount, ranges from about 0.1 to about 2 percent and preferably from about 0.3 to about 1 percent by weight of the composition to be stabilized.

The amount of EDTA which is an effective, stabilizing amount ranges from about 0.001 to about 1 percent and preferably about 0.01 to about 0.1 percent by weight of the composition to be stabilized.

The amount of magnesium salt which is an effective, stabilizing amount ranges from about 0.001 to about 1 percent and preferably about 0.01 to about 1 percent by weight of the composition to be stabilized. Typical magnesium salts which may be used in the invention include water soluble salts such as, for example, magnesium sulfate and magnesium chloride; magnesium sulfate is preferred.

EXAMPLE I

Stabilized formulations of urea peroxide or hydrogen peroxide were prepared by combining the following materials to form stabilized solutions, as shown in Table 1.

Table 1

| | (% w/v) | | | | | | |
|---|---|---|---|---|---|---|---|
| | 1 | 2 | 3 | 4 | 5 | 6 | 7 |
| Urea Peroxide | 2.2 | — | 2.2 | 2.2 | 2.2 | 2.2 | 2.2 |
| Hydrogen Peroxide | — | 1.54 | — | — | — | — | — |
| Lignin Sulfonate | 0.5 | 0.5 | 0.5 | 0.5 | 0.5 | 0.5 | 0.5 |
| EDTA | 0.025 | 0.025 | 0.025 | 0.025 | 0.026 | 0.025 | 0.025 |
| Magnesium Sulfate Heptahydrate | 0.042 | 0.042 | 0.042 | 0.042 | 0.042 | 0.042 | 0.042 |
| Dipotassium Phosphate | 2.5 | 1.25 | 0.625 | 0.625 | — | 1.25 | 1.25 |
| Potassium Phosphate | 8.7 | 4.35 | 2.173 | 2.173 | — | 4.35 | 4.34 |
| Ammonium Phosphate | — | — | 1.0 | — | — | — | 2.0 |
| Urea | 8.91 | 2.31 | 0.9 | 1.155 | — | 1.155 | 0.642 |
| Potassium Hydroxide | 0.022 | 0.022 | 0.022 | 0.022 | 0.022 | — | 0.022 |
| Phosphoric Acid q.s. ad | pH 5.0 | pH 5.0 | pH 5.0 | pH 5.0 | pH 5.0 | pH 5.0 | pH 5.0 |
| Water q.s. ad | 100 | 100 | 100 | 100 | 100 | 100 | 100 |

I claim:

1. A stabilized, aqueous, peroxide-containing composition comprising water, a peroxide selected from the group consisting of hydrogen peroxide and urea peroxide and from about 0.1 to about 2 percent lignin sulfonate.

2. The composition of claim 1 additionally containing an effective, stabilizing amount of EDTA.

3. The composition of claim 2 additionally containing an effective, stabilizing amount of a nontoxic magnesium salt.

4. A stabilized aqueous, peroxide-containing plant food composition comprising plant nutrients, water, a peroxide selected from the group consisting of hydrogen peroxide and urea peroxide, and from about 0.1 to about 2 percent lignin sulfonate.

5. The composition of claim 4 additionally containing an effective, stabilizing amount of EDTA.

6. The composition of claim 5 additionally containing an effective, stabilizing amount of a nontoxic magnesium salt.

7. A stabilized aqueous, peroxide-containing plant food composition comprising plant nutrients, water, a peroxide selected from the group consisting of hydrogen peroxide and urea peroxide, and from about 0.1 to about 4 percent of a composition comprising a lignin sulfonate, EDTA and magnesium sulfate.

8. A method for stabilizing an aqueous, peroxide-containing composition wherein the peroxide is selected from the group consisting of hydrogen peroxide and urea peroxide, comprising combining the peroxide-containing composition with from about 0.1 to about 2 percent lignin sulfonate.

9. The method of claim 8 wherein the composition is additionally combined with an effective, stabilizing amount of EDTA.

10. The method of claim 9 wherein the composition is additionally combined with an effective, stabilizing amount of a nontoxic magnesium salt.

11. A method for stabilizing an aqueous peroxide-containing plant food composition, wherein the peroxide is selected from the group consisting of hydrogen peroxide and urea peroxide, comprising combining the peroxide-containing plant food composition with from about 0.1 to about 4 percent of a composition comprising lignin sulfonate, EDTA and magnesium sulfate.

* * * * *